United States Patent [19]

Tsai

[11] Patent Number: 5,202,155
[45] Date of Patent: Apr. 13, 1993

[54] METHOD FOR STABILIZING MAGENTIC METAL PARTICLES

[75] Inventor: Tzeng-Shii Tsai, Hsinchu Hsien, Taiwan

[73] Assignee: Industrial Technology Research Institute, Hsinchu, Taiwan

[21] Appl. No.: 900,177

[22] Filed: Jun. 17, 1992

[51] Int. Cl.$^5$ .............................................. B05D 5/12
[52] U.S. Cl. ..................................... 427/127; 427/128
[58] Field of Search .................................. 427/127, 128

Primary Examiner—Bernard Pianalto
Attorney, Agent, or Firm—Ladas & Parry

[57] ABSTRACT

A method for stabilizing magnetic metal particles includes the steps of: (a) subjecting the magnetic metal particles to a reduction reaction; (b) isolating the reduced magnetic metal particles from air and dipping them in an organic solvent; (c) allowing the organic solvent to vaporize slowly in air, thereby forming oxidized layers on the magnetic metal particles; and (d) mixing the magnetic metal particles in step (c) with a titanate coupling agent solution to form absorbed layers of a titanate coupling agent on the surfaces of the magnetic metal particles.

4 Claims, No Drawings

METHOD FOR STABILIZING MAGENTIC METAL PARTICLES

BACKGROUND OF THE INVENTION

1. Field of the Invention

This invention relates to magnetic metal particles, more particularly to a method for stabilizing magnetic metal particles.

2. Description of Related Art

Magnetic metal particles are usually used for manufacturing videotapes, audio tapes and disks which have high magnetization. One drawback is that the magnetic metal particles are easily oxidized, resulting in the easy reduction of the magnetization of the magnetic metal particles. Many methods for stabilizing magnetic metal particles have been disclosed in Japanese patents 64-21002 1989, 63-299202 (1988), 52-155398 (1977), 52-21251 (1977) and 53-76958 (1978). In Japanese patent 64-21002 (1989), the stability of magnetic metal powder is improved by heat treatment. The resultant magnetic metal powder has a saturation magnetization of 130 emu/g and a magnetic coercive force of 1,500 Oe. After the resultant magnetic metal powder is subjected to a weather resistance test at 60° C. and 90% RH for 7 days, the saturation magnetization thereof becomes 112 emu/g. In Japanese Patent 63-299202 (1988), the stability of magnetic metal powder is improved by applying a coating of aliphatic cyclic primary amine thereto. The resultant magnetic metal powder has a saturation magnetization of 124–125 emu/g. However, the improvement achieved by the prior inventions with respect to the saturation magnetization of the magnetic metal particles after the stabilization treatment is generally unsatisfactory.

SUMMARY OF THE INVENTION

The objective of this invention is to provide a method for stabilizing magnetic metal particles. The treated magnetic metal particles have good stability and high saturation magnetization.

Accordingly, a method of this invention for stabilizing magnetic metal particles includes the steps of: (a) subjecting the magnetic metal particles to a reduction reaction; (b) isolating the reduced magnetic metal particles from air and dipping them in an organic solvent; (c) allowing the organic solvent to vaporize slowly in air, thereby forming oxidized layers on the magnetic metal particles; and (d) mixing the magnetic metal particles in step (c) with a titanate coupling agent solution to form absorbed layers of a titanate coupling agent on the surfaces of the magnetic metal particles.

DETAILED DESCRIPTION OF THE PREFERRED EMBODIMENTS

According to this invention, magnetic metal particles are first subjected to a reduction reaction. The reduced magnetic metal powder is isolated from air and is dipped in an organic solvent. The organic solvent is allowed to vaporize in air, thereby forming oxidized films on the magnetic metal particles. Afterwards, the magnetic metal particles are mixed with a titanate coupling agent solution so that they absorb layers of a titanate coupling agent on the surfaces thereof. Finally, the magnetic metal particles are dried in air.

The titanate coupling agent has a formula of $(R_1-O)_m-Ti(O-X-R_2-Y)_n$, $m=1$, $n=1-3$. The X is selected from the group consisting of an alkyl group, a carboxyl group, a sulfonate, a phenolate and a phosphate. The Y is a thermosetting functional group selected from a group consisting of methacrylate and amine. $R_1$ and $R_2$ is a hydrocarbon group having a carbon number of 4 to 40. The titanate coupling agent solution includes an organic solvent selected from the group consisting of toluene and xylene. The concentration of the titanate coupling agent solution is between 0.1 wt % and 10 wt %, preferably between 1 wt % and 5 wt %.

The titanate coupling agent is usually used as a disperser or a stabilizer for solid-in-liquid suspensions. The titanate coupling agent not only increases the stability of the magnetic metal particles but also increases the dispersity of the magnetic metal particles.

The invention will be illustrated by way of the following EXAMPLES.

EXAMPLE 1

20 g Goethite, $\alpha$-FeOOH, (0.1–0.3 $\mu$m long and an axial ratio of 10) is dehydrated to form $\alpha$-Fe$_2$O$_3$ at a temperature of 300° C. in air. After annealing at 800° C. for 30 minutes, the $\alpha$-Fe$_2$O$_3$ is subjected to a reduction reaction in a current of hydrogen (flow rate of 0.2 l/min, 400° C.) to form an $\alpha$-Fe magnetic powder. When the $\alpha$-Fe magnetic powder is cooled to 50° C., it is isolated from air and is dipped in a toluene solvent. The toluene solvent is allowed to vaporize slowly in air, thereby forming oxidized layers on the surfaces of the $\alpha$-Fe magnetic powder particles. The $\alpha$-Fe magnetic powder is then mixed with a titanate coupling agent solution which contains a toluene solvent and a titanate coupling agent and which has a concentration of 2 wt %. After mixing homogeneously by agitation, the liquid therein is filtered out and the solid therein is air dried. Finally, the $\alpha$-Fe magnetic powder particles have thin layers of a titanate coupling agent thereon. The titanate coupling agent has a structural formula ($l_{38}$) shown in the following:

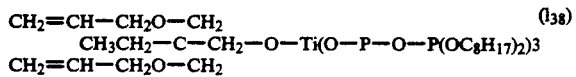

The resultant stabilized magnetic metal powder has a saturation magnetization ($\sigma_s$) of 138 emu/g and a magnetic coercive force (Hc) of 1,650 $\sigma_e$. After the resultant stabilized magnetic metal powder is subjected to a weather resistance test at 60° C. and 90% RH for 7 days, the saturation magnetization ($\sigma_s$) and the magnetic coercive force (Hc) thereof become 118 emu/g and 1,700 O$_e$. The degradation rate of $\sigma_s$ is 14.5%.

EXAMPLE 2

The operation and conditions of the EXAMPLE 2 are substantially similar to those of EXAMPLE 1 except that the concentration of the titanate coupling agent solution is 3.5 wt %. The properties of the resultant magnetic metal powder of EXAMPLE 2 are shown in TABLE 1.

EXAMPLE 3

The operation and conditions of the EXAMPLE 3 are substantially similar to those of EXAMPLE 1 except that the titanate coupling agent has a structural formula ($l_{97}$) as described below:

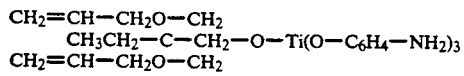

The properties of the resultant magnetic metal powder of EXAMPLE 3 are shown in TABLE 1.

CONTROL 1

The α-Fe magnetic powder prepared in EXAMPLE 1 is neither treated with toluene nor treated with titanate coupling agent solution. The α-Fe magnetic powder has a tendency towards spontaneous firing. Tests were conducted to investigate the properties of the α-Fe magnetic powder, and the results are shown in TABLE 1.

CONTROL 2

The α-Fe magnetic powder prepared in EXAMPLE 1 is treated with toluene solvent but not with titanate coupling agent solution. Tests were conducted to investigate the properties of the resultant α-Fe magnetic powder, and the results are shown in TABLE 1.

CONTROL 3

The α-Fe magnetic powder prepared in EXAMPLE 1 are treated with titanate coupling agent solution but not with toluene solvent. Since the α-Fe magnetic powder is not treated with the toluene solvent to form oxidized films thereon, they may have a tendency to react with the titanate coupling agent, so the reduction of $\sigma_s$ of the resultant α-Fe magnetic powder of the CONTROL 3 occurs. Tests were conducted to investigate the properties of the resultant α-Fe magnetic powder, and the results are shown in TABLE 1.

TABLE 1

|  | treatment | properties after treatment | | properties after weather resistance test (60° C., 90% RH, 7 days) | degradation rate |
|---|---|---|---|---|---|
|  |  | $\sigma_s$(emu/g) | Hc(Oe) | $\sigma_s$(emu/g) | ($\sigma_s$) |
| EXAMPLE | | | | | |
| 1 | $I_{38}$ 2 wt % | 138 | 1650 | 118 | 14.5% |
| 2 | $I_{38}$ 3.5 wt % | 133 | 1630 | 114 | 14.3% |
| 3 | $I_{97}$ 2 wt % | 138 | 1660 | 117 | 15.2% |
| CONTROL | | | | | |
| 1 | without treatment | spontaneous firing | | | |
| 2 | toluene added | 130 | 1600 | 97 | 25.4% |
| 3 | titanate coupling agent added | 102 | 1400 | 71 | 30.4% |

The resultant stabilized magnetic metal powder of this invention has a better stability and a higher saturation magnetization than that of the above described prior inventions.

While the present invention has been described in connection with what is considered the most practical and preferred embodiment, it is understood that this invention is not limited to the disclosed embodiments but is intended to cover various arrangements included within the spirit and scope of the broadest interpretations and equivalent arrangements.

I claim:

1. A method for stabilizing magnetic metal particles comprising the steps of:
   (a) subjecting said magnetic metal particles to a reduction reaction;
   (b) isolating said reduced magnetic metal particles from air and dipping them in an organic solvent;
   (c) allowing said organic solvent to vaporize slowly in air, thereby forming oxidized layers on said magnetic metal particles; and
   (d) mixing said magnetic metal particles in step (c) with a titanate coupling agent solution to form absorbed layers of a titanate coupling agent on the surfaces of said magnetic metal particles, said titanate coupling agent solution including an organic solvent and having a concentration of 0.1 wt % to 10 wt %, said titanate coupling agent having a formula of $(R_1-O)_m-Ti(O-X-R_2-Y)_n$, m=1, n=1-3, said X being selected from the group consisting of an alkyl group, an carbonyl group, a sulfonate, a phenolate and a phosphate, said Y being a thermosetting functional group selected from a group consisting of methacrylate and amine, said $R_1$ and $R_2$ being a hydrocarbon group having a carbon number of 4 to 40.

2. A method for stabilizing magnetic metal particles as claimed in claim 1, wherein said organic solvent in step (b) is a toluene.

3. A method for stabilizing magnetic metal particles as claimed in claim 1, wherein said organic solvent in step (d) is selected from the group consisting of toluene and xylene.

4. A method for stabilizing magnetic metal particles as claimed in claim 1, wherein the concentration of said titanate coupling agent solution is between 1 wt % and 5 wt %.

* * * * *